(12) United States Patent
Song et al.

(10) Patent No.: US 12,534,663 B2
(45) Date of Patent: Jan. 27, 2026

(54) RE-CROSSLINKABLE HYPER-BRANCHED POLYMER GELS BASED ON A TRANSAMIDATION REACTION

(71) Applicant: The Curators of the University of Missouri, Columbia, MO (US)

(72) Inventors: Tao Song, Rolla, MO (US); Baojun Bai, Rolla, MO (US); Thomas P. Schuman, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 272 days.

(21) Appl. No.: 18/251,859

(22) PCT Filed: Sep. 20, 2021

(86) PCT No.: PCT/US2021/047475
§ 371 (c)(1),
(2) Date: May 4, 2023

(87) PCT Pub. No.: WO2022/098411
PCT Pub. Date: May 12, 2022

(65) Prior Publication Data
US 2024/0132771 A1    Apr. 25, 2024

Related U.S. Application Data

(60) Provisional application No. 63/109,741, filed on Nov. 4, 2020.

(51) Int. Cl.
| | |
|---|---|
| *C09K 8/512* | (2006.01) |
| *C07C 211/13* | (2006.01) |
| *C08F 212/36* | (2006.01) |
| *C08F 220/56* | (2006.01) |
| *C08G 73/02* | (2006.01) |
| *C08J 3/075* | (2006.01) |
| *C08K 3/34* | (2006.01) |

(52) U.S. Cl.
CPC ............ *C09K 8/512* (2013.01); *C07C 211/13* (2013.01); *C08F 212/36* (2013.01); *C08F 220/56* (2013.01); *C08G 73/0206* (2013.01); *C08J 3/075* (2013.01); *C08K 3/346* (2013.01); *C08J 2300/202* (2013.01); *C08J 2333/26* (2013.01); *C09K 2208/10* (2013.01)

(58) Field of Classification Search
CPC ... C09K 8/512; C09K 2208/10; C07C 211/13; C08G 73/0206
See application file for complete search history.

(56) References Cited

U.S. PATENT DOCUMENTS

| | | | |
|---|---|---|---|
| 4,660,645 A | 4/1987 | Newlove et al. | |
| 5,118,717 A | 6/1992 | Hodgdon et al. | |
| 6,454,003 B1 | 9/2002 | Chang et al. | |
| 8,802,896 B2 * | 8/2014 | Amao | C07C 217/28 564/123 |
| 10,150,910 B2 | 12/2018 | Ogle et al. | |
| 11,214,729 B2 * | 1/2022 | Long | C08F 220/56 |
| 12,247,156 B2 * | 3/2025 | Long | C09K 8/514 |
| 2012/0037364 A1 | 2/2012 | Guan et al. | |
| 2014/0102707 A1 | 4/2014 | Moradi-Araghi et al. | |
| 2014/0144628 A1 | 5/2014 | Moradi-Araghi et al. | |
| 2015/0013984 A1 * | 1/2015 | Abivin | C09K 8/03 166/300 |
| 2017/0233641 A1 * | 8/2017 | Singh | C09K 8/685 166/308.5 |
| 2019/0119559 A1 | 4/2019 | O'Toole et al. | |
| 2020/0071601 A1 | 3/2020 | Long et al. | |
| 2020/0407622 A1 * | 12/2020 | Bai | C08J 3/075 |
| 2024/0050924 A1 * | 2/2024 | Kirchhoff | C08G 73/0206 |
| 2024/0132771 A1 * | 4/2024 | Song | C09K 8/508 |
| 2025/0051506 A1 * | 2/2025 | Dustin | C09D 161/20 |

FOREIGN PATENT DOCUMENTS

| | | | | |
|---|---|---|---|---|
| CN | 108219009 A | 6/2018 | | |
| WO | WO-2014066248 A1 * | 5/2014 | ............... | C09K 8/12 |
| WO | 2017210486 A1 | 12/2017 | | |
| WO | 2020046939 A1 | 3/2020 | | |
| WO | WO-2022055555 A1 * | 3/2022 | ................ | C08J 5/04 |

OTHER PUBLICATIONS

International Search Report and Written Opinion in related PCT Application No. PCT/US2021/047475, mailed Sep. 20, 2021, 15 pages.

* cited by examiner

*Primary Examiner* — Philip C Tucker
(74) *Attorney, Agent, or Firm* — HOVEY WILLIAMS LLP

(57) ABSTRACT

The present invention generally relates to the field of conformance control in oil fields, particularly to a re-crosslinkable preformed particle gel system, and composition thereof. The composition of the re-crosslinkable preformed particle gel system contains monomers, crosslinkers, a polymer matrix, and additives. Components in the composition for re-crosslinkable preformed particle gel in the present invention have excellent compatibility with each other, and the obtained gel has excellent long term high-temperature resistance property. Different from prior products, in the re-crosslinkable preformed particle gel compositions according to embodiments of the present invention, the components that are used to re-crosslink the particle gels may be grafted on the polymer chain and will act as initiator or secondary crosslinker in different conditions. During particle injection process, all compositions would move together, thereby avoiding chromatographic problems typical of prior products.

20 Claims, 5 Drawing Sheets

RE-CROSSLINKABLE HYPER-BRANCHED POLYMER GELS BASED ON A TRANSAMIDATION REACTION

CROSS REFERENCE TO RELATED APPLICATIONS

This application is the U.S. National Stage of International Patent Application No. PCT/US2021/047475, filed Sep. 20, 2021, which is hereby incorporated by reference in its entirety, and which claims priority to U.S. Provisional Patent Application No. 63/109,741, filed Nov. 4, 2020.

BACKGROUND OF THE INVENTION

Field of the Invention

The present invention generally relates to the field of oilfield chemistry. More precisely, this invention is related to high temperature (e.g., up to about 130° C.) resistance hydrogel particles that can re-crosslink in petroleum reservoirs, their preparation and use thereof.

Description of Related Art

Water flooding is a commonly used method for increasing the recovery of crude oil from an oil reservoir by maintaining the pressure within the reservoir. However, prolonged water flooding of a reservoir can intensify the heterogeneity of the reservoir, which can accelerate the rising rate of water production and reduce the sweep efficiency as the injected water sweeps the oil toward production wells. Due to the limited swept volume, most of the crude oil may remain in the oil reservoir. One way to enhance the oil recovery is to block the high permeability zone through which the injected water preferentially flows with polymer gels or other materials, thus enhancing the swept volume by forcing the injected water to flow through the low permeable unswept zones.

Acrylamide-based polymer gels have been designed and successfully applied to improve sweep efficiency and to reduce excessive water production by minimizing reservoir heterogeneity. Based on the composition and application method, polymer gels can be divided into three types: in-situ monomer-based gels, in-situ polymer-based gels, and pre-formed particle gels (PPG).

Monomer-based 'in situ' gels, due to their high toxicity and uncontrollable crosslinking time, have been banned by most countries. In the past 50 years, in-situ polymer-based gels have become the most commonly used gel system. In the gel treatment, a mixture of polymer and crosslinkers is injected into the oil reservoir or other subterranean formation. Based on the type of crosslinkers, the in-situ polymer-based gels can be further divided into two types: gels crosslinked by metal and gels crosslinked by organic chemicals. The most commonly used polymer and cross-linker are partially hydrolyzed polyacrylamide and chromic ion $Cr^{3+}$, respectively. However, the gels crosslinked (or associated) by $Cr^{3+}$ are unstable when exposed to high temperature (i.e., about 100° C. or higher). The gels crosslinked by organic chemicals (e.g., phenolic resin) have much better temperature resistance, but the high toxicity of the chemicals (formaldehyde, resorcinol) can cause environmental contamination problems. Thus, the gels crosslinked by phenolic resin are similarly not allowed by many countries.

Preformed particle gels (PPG) with better thermal stability and environmental friendliness have also been developed. Different from in-situ gels in composition, PPGs have been synthesized by co-polymerization of monomers and cross-linkers. PPGs have advantages over polymer based in-situ gels, including a simple preparation process and environmental friendliness. However, PPGs are not very efficient when they are used in large opening features in reservoirs, such as open fractures, fracture-like channels or void space conduits, and so on, which widely exist in many mature oilfields.

Many products have been developed to manage the severe water production of mature crude oil production wells. For example, U.S. Pat. No. 9,611,420 describes a plugging system that includes an aqueous phase, a chitosan-based compound and some cross-linker having one or two of the following functional groups: aldehyde, carboxylic acid and carboxylate. After the reaction between chitosan and aldehyde or other functional group(s), the high permeability region can be blocked. However, the poor solubility of chitosan (1-2 wt %, acid condition) may hinder the application of this product.

One commercially available expandable plugging agent is marketed under the tradename Bright Water (described in U.S. Pat. No. 6,454,003). This plugging agent is prepared by inverse emulsion polymerization. It consists of a polymer matrix crosslinked by two kinds of crosslinkers (labile and stable crosslinker) and a surfactant which is used to prevent coagulation. After the breakage of the labile PEG crosslinker, the micro-particle may further expand and block the high permeability zones. However, results have shown that the micro-particles can be washed-out from the formation by subsequent water injection.

U.S. Pat. App. Pub. No. 2014/0144628 discloses a method for preparing an environmentally friendly smart gel. The gel contains several cross-linkers, including stable, labile and tertiary cross-linkers. The gel is first crosslinked by a labile cross-linker and a stable cross-linker. The gel particles are highly cross-linked with two cross-linkers: a small amount of stable cross-linker and a large amount of labile cross-linker. After forming the micro-particle gel powder, the tertiary cross-linker is blended with the powder. After being pumped into the formation, the labile cross-linker breaks, and the particle can be further expanded by absorbing the displacing fluid. The special properties of these particles allow them to block the high permeability zone. The swelled particles can also react with the tertiary cross-linker and form a new covalent bond-based network. However, the tertiary cross-linker is blended with the particles. Thus, chromatographic problems can occur during the injection of these particles.

Despite the gel systems described above, improved gel systems are needed for high temperature reservoirs with severe channeling problems.

SUMMARY OF THE INVENTION

The present invention is broadly concerned with particle gel compositions for use in reservoirs with temperatures approaching about 130° C. This PPG has adjustable size ranges from nano-, micro- or millimeter size, allowing it to be used in different permeability reservoirs with different channeling problems to plug open fractures, void space conduits or matrix channels.

In one embodiment, there is provided a composition for controlling fluid flow. The composition comprises a plurality of swellable particles. The particles comprise a re-crosslinking agent embedded within a polymer matrix, and wherein upon swelling, the particles exhibit less than about a 50 percent decrease in volume after being exposed to a temperature of at least about 100° C. for at least about 1 hour.

In another embodiment, there is provided a method of forming the composition above. The method comprises: (a) polymerizing the polymer matrix in the presence of the re-crosslinking agent to form the polymer matrix and embed the re-crosslinking agent within the polymer matrix; (b) drying the polymer matrix to form a dried polymer matrix; and (c) grinding the dried polymer matrix to form the composition.

In another embodiment, there is provided a method of forming a gel formation in a target zone of a subterranean environment. The method comprises: (a) dispersing the composition above into a carrier fluid, thereby causing the swellable particles to swell; and (b) introducing the carrier fluid comprising the composition into the target zone having a temperature of at least 50° C., thereby causing the re-crosslinking agent to react with a monomer within the polymer matrix and form the gel formation.

In another embodiment, there is provided a synthetic crosslinking and/or re-crosslinking compound having the chemical formula:

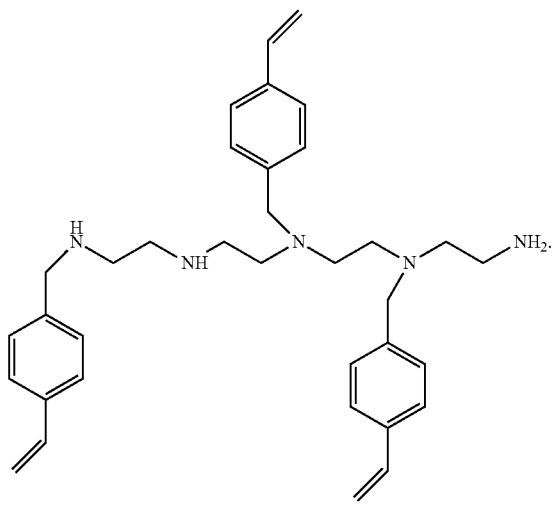 [SMILES: C=Cc1ccc(CNCCNCCN(CCN(CCN)Cc2ccc(C=C)cc2)Cc2ccc(C=C)cc2)cc1]

DETAILED DESCRIPTION

Figure 1:
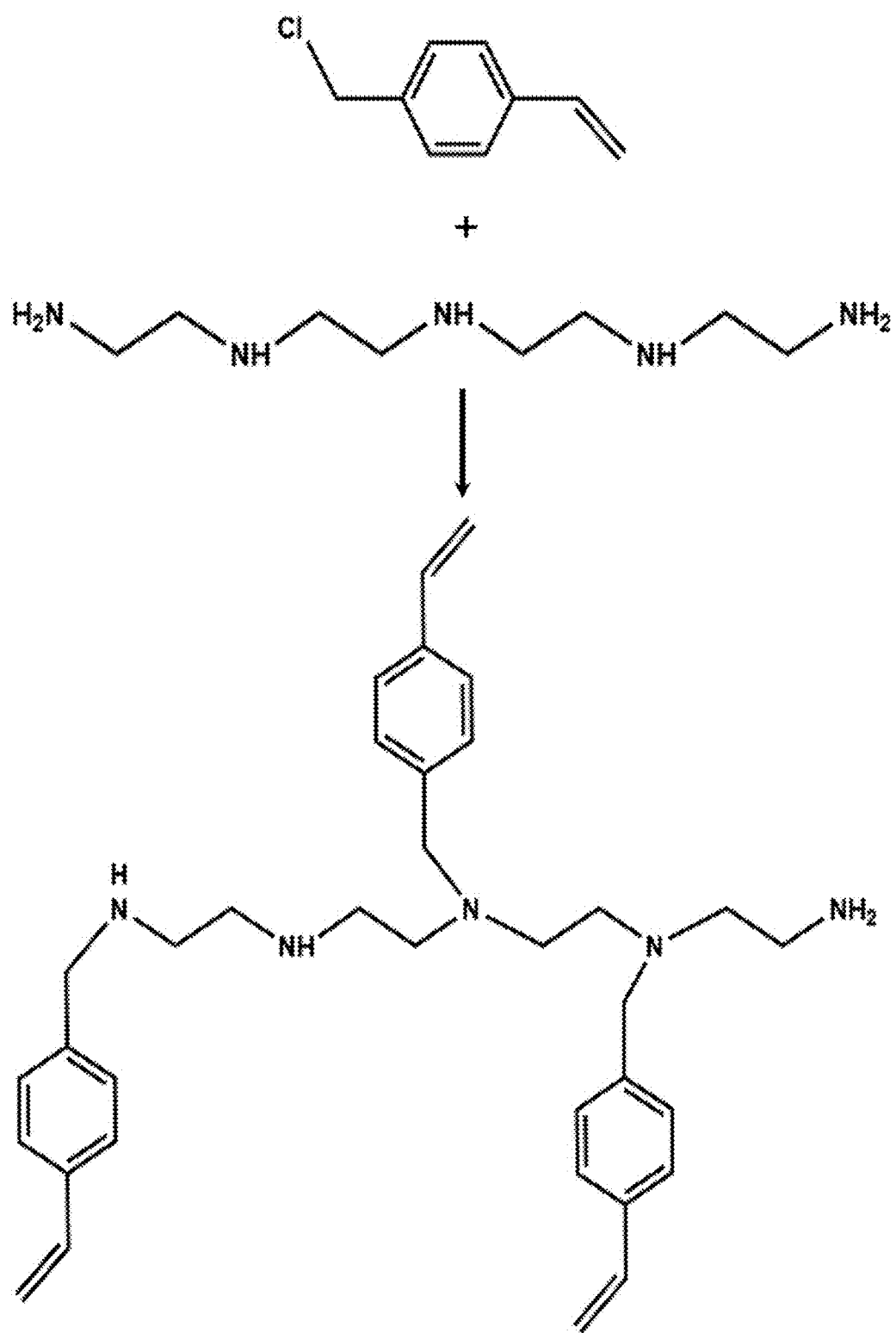
FIG. 1 depicts the synthesis reaction scheme of environmentally friendly crosslinking compounds.

The present invention is concerned with particle gel compositions, and particularly recrosslinkable particle gel ("RPPG") compositions, that can be used for conformance control, fluid loss control, or the plugging of super-permeable zones or openings for the other purposes. In certain embodiments, the RPPG compositions described herein demonstrate improved stability at higher temperatures. In some embodiments, the RPPG compositions (and the particles therein) are thermally stable at higher temperatures than previous particle gel compositions. In certain embodiments, the present invention is directed to the synthetic process of forming particle gels which can re-crosslink under ultra-high temperature and the compositions formed therefrom. Thus, the particle gels according to embodiments of the present invention may be called high temperature resistant re-crosslinkable preformed particle gel ("HT-RPPG"). In water profile management, the particles can be dispersed into formation water, thereby causing the particles to swell and form a bulk gel. The gel composition can then be pumped into the subterranean formation as a bulk gel having high temperature stability.

The HT-RPPG compositions described herein are particle gel compositions comprising a plurality of swellable particles. In use, the particles can be dispersed or suspended in a carrier fluid (e.g., water, brine, or other formation fluid), thereby causing the particles to swell and re-associate and/or re-crosslink (i.e., self-heal) to reform an ostensibly bulk gel material at subterranean conditions and maintain the bulk gel stability under high-temperature conditions. The thermal stability can generally be evidenced by the particles retaining their swollen volumes and/or the bulk gel retaining its mechanical properties (e.g., retaining at least more than 50% of its elastic modulus) when exposed to high temperatures over long periods of time. Advantageously, in some embodiments, upon swelling, the particles exhibit less than about 50 percent, less than about 60 percent, less than about 70 percent, less than about 80 percent, less than about 90 percent, less than about 95 percent, less than about 99 percent decrease in volume after being exposed to a temperature of greater than about 100° C., greater than about 110° C., greater than about 120° C., or up to about 130° C. for at least about 1 hour, at least about 2 hours, at least about 5 hours, at least about 12 hours, at least about 1 day, at least about 10 days, at least about 30 days, at least about 6 months, at least about 1 year, at least about 2 years, at least about 3 years, or at least about 5 years.

The HT-RPPG compositions may generally comprise and/or be synthesized using a variety of monomers, polymers, initiators, crosslinking agents ("cross-linker I"), re-associating and/or re-crosslinking agents ("cross-linker II"), initiators, nano-clays, surfactants, and other additives. In certain embodiments, all of the components are uniformly distributed in the solution or mixture and uniformly incorporated as contained in the gel structure during polymerization (i.e., before the polymer is ground into particles). In certain embodiments, the HT-RPPG may be synthesized through aqueous solution free radical polymerization or emulsion polymerization. The synthesis method is not particularly limited, and other methods such as suspension polymerization, can be used in accordance with certain embodiments. In one or more embodiments, the HT-RPPG compositions comprise (consist of, or consist essentially of) a re-crosslinking agent embedded within a polymer matrix. In certain embodiments, the HT-RPPG compositions further comprise one or more crosslinking agents, re-associating agents, initiators, clays, surfactants, and/or additives.

As used herein, the "polymer matrix" refers to a polymer network formed via free radical polymerization in solution wherein the polymer chains were connected via crosslinking, which takes place simultaneously with the growth of polymer chains. The polymer matrix is generally formed from and comprises at least one monomer that is interactive with the re-crosslinking agent (i.e., the monomer is cross-linkable by said re-crosslinking agent). In certain embodiments, the polymer matrix comprises one or more monomers and/or one or more polymers.

The polymer matrix can be obtained by either homopolymerization or copolymerization, and is generally formed from and comprises at least one monomer that is reactive with the re-crosslinking agent (i.e., the monomer is cross-linkable by said re-crosslinking agent), particularly at subterranean conditions. In particular embodiments, the monomer is crosslinkable by the re-crosslinking agent at high temperature (at least 50° C., 60° C., 70° C., 80° C., 90° C., 100° C., 110° C., 120° C., 130° C.) and/or high-salinity subterranean conditions. Additionally, during the synthesis of the HT-RPPG, the re-crosslinking agent becomes embedded within the polymer matrix, which provides close proximity for the monomer and the re-crosslinking to react when the water-swollen, reassembled HT-RPPG mass of particles is exposed to a particular target temperature in the subterranean environment.

The one or more monomers may comprise any of a number of compounds that have reactive functional groups and can react with each other through chain growth polymerization or step growth polymerization. In some embodiments, the one of more monomers are selected from the group consisting of acrylamide, 2-acrylamide-2-aethylpropanesulfonic acid, 4-acryloylmorpholine, N, N-dimthylacrylamide, N-methylolacrylamide, acryloyloxyethyltrimethyl ammonium chloride, methacryloxyethyltrimethyl ammonium chloride sodium, 4-ethenylbenzene-1-sulfonate, acrylic acid, vinyl acetate, N-vinyl formamide, N-viny pyrrolidone, 4-vinylpyridine, tolylene-2,4-diisocyanate, octacosyl acrylate, vinylimidazole, dodecyl acrylate, hexadecyl acrylate, and octacosyl acrylate. In some embodiments, the one or more monomers comprise one or more re-crosslinkable moieties, such as amide or isocyanate groups.

The one or more polymers may comprise a variety of homopolymers and/or copolymers. Particularly preferred polymers include those that can be used to form "double network" crosslinking structures, as described in greater detail below. In certain embodiments, the one or more polymers are selected from the group consisting of poly (vinyl alcohol) (PVA), sodium alginate, and poly (vinyl pyrrolidone) (PVP). PVP and PVA have better thermal stability than polyacrylamide, which provides improved the thermal stability compared to traditional particle gels. The rigid polymer chain in PVP also enhances the strength of the RPPG compositions. PVA can be used to form an interpenetrating polymer network by the reaction between dialdehyde or diisocyanate. Sodium alginate (i.e., alginate salts) can be crosslinked by divalent ions.

In some embodiments, the polymer chains (backbone) of the polymer matrix comprise a homopolymer, which is formed from a single type of monomer. In certain embodiments, the monomer is an amide monomer (i.e., a monomer comprising an amide functional group). In some embodiments, the amide monomer is selected from the group consisting of acrylamide, methacrylamide, N-methylacrylamide, N-tert-butylacrylamide, N-ethylacrylamide, N-hydroxyethyl acrylamide, N-isopropylacrylamide, N, N-diethylacrylamide, dimethylaminopropyl acrylamide, dimethylaminopropyl methacrylamide, acrylamide, N-isopropylacrylamide, N,N-dimethylacrylamide, N,N-diethylacrylamide, dimethylaminopropyl acrylamide, dimethylaminopropyl methacrylamide, N-vinyl formamide. Particularly preferred nonionic amide monomers include acrylamide, N-methylacrylamide, N,N-dimethylacrylamide, and methacrylamide. Advantageously, amide monomers in the polymer matrix can react with the re-crosslinking agent through transamidation as shown in the reaction scheme below.

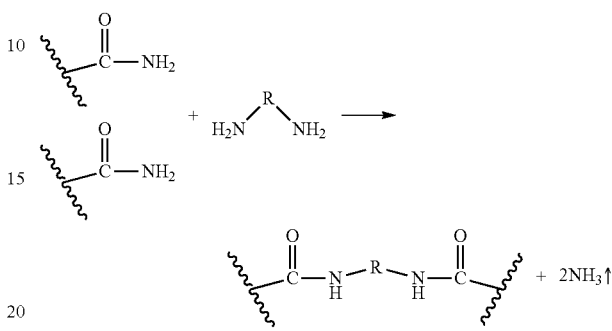

In some embodiments, the polymer chains (backbone) of the polymer matrix comprise a copolymer, which is formed from two or more types of monomers. In certain such embodiments, at least one of the two or more types of monomers comprises a monomer that can react with the re-crosslinking agent, such as under appropriate stimulus (e.g., high temperature) at subterranean conditions. In some embodiments, the at least one monomer comprises a sulfonate, sulfate, or phosphate monomer. In some embodiments, the monomer comprises sulfonate, sulfate, or phosphate group(s); sodium or potassium vinylsulfonate and vinyl sulfate salts like sodium or potassium vinyl sulfates; phenyl vinyl sulfonate salts like sodium or potassium phenyl vinyl sulfate; and/or vinyl phosphate salts like sodium or potassium vinyl sulfate. In some embodiments, the monomer is 2-acrylamido-2-methyl-1-propanesulfonic acid sodium salt (Na-AMPS).

In some embodiments, the at least one of the two or more monomers comprises a water-soluble monomer that contains cationic pendant groups, such as diallyldimethylammonium chloride, (3-(methacryloylamino) propyl) trimethyl ammonium chloride, (2-(methacryloyloxy) ethyl) trimethyl ammonium chloride, and/or vinylbenzyl trimethyl ammonium chloride. In some other embodiments, the alternative monomers with cationic pendant groups include dimethylaminoethylacrylate methyl chloride quaternary salt, dimethylaminoethylacrylate benzyl chloride quaternary salt, and/or dimethylaminoethylmethacrylate methyl chloride quaternary salt.

In some embodiments, the at least one of the two or more monomers comprises a nonionic monomer. Representative nonionic monomers include hydroxyethyl acrylate, hydroxypropyl acrylate, hydroxyethyl methacrylate, hydroxypropyl methacrylate, dimethylaminoethylacrylate (DMAEA), and dimethylaminoethyl methacrylate (DMAEM). Generally, C8-C22 backbones can be employed. Exemplary hydrophobic monomers include the higher alkyl esters such as octyl, decyl, dodecyl, tridecyl, tetradecyl, octadecyl, etc. of α,β-ethylenically unsaturated carboxylic acids, such as acrylates and methacrylates. Also included are alkyl esters having 8 to 22 carbon atoms with ethylenically unsaturated carboxylic acids such as maleic anhydride, fumaric acid, itaconic acid and aconitic acid, alkylaryl esters of ethylenically unsaturated carboxylic acids such as nonyl-o-phenyl acrylate, nonyl-α-phenyl methacrylate, dodecyl-α- phenyl acrylate and dodecyl-α-phenyl methacrylate; N-alkyl, ethylenically unsaturated amides such as N-octadecyl acrylamide, N-octadecyl methacrylamide, N,N-dioctyl acrylamide and similar derivatives thereof; α-olefins such as 1-octene, 1-decene, 1-dodecene and 1-hexadecene; vinyl alkylates wherein alkyl has at least 8 carbons such as vinyl laurate and vinyl stearate; vinyl alkyl ethers such as dodecyl vinyl ether and hexadecyl vinyl ether; N-vinyl amides such as N-Vinylpyrrolidone, N-vinyl lauramide and N-vinyl stearamide; and alkyl aromatics such as t-butyl styrene or t-butyl phenyl.

In one or more embodiments, when the polymer matrix comprises a copolymer, the polymer matrix may comprise at least 40, 45, 50, 55, 60, 65, 70, 75, or 80 and/or less than 99, 95, 90, or 85 molar percent of the at least one monomer that can react with the re-crosslinking agent, based on the total molar content of the polymer matrix taken as 100 percent.

In some embodiments, the polymer matrix does not include, and is substantially free of, $CO_2$-philic moieties. $CO_2$-philic moieties refer to molecular entities in the polymer that is attracted to $CO_2$ molecules and has strong interactions with $CO_2$ that are more thermodynamically favorable than the interactions with polar solvents. Specifically, in some embodiments, the polymer matrix is substantially free of $CO_2$-philic monomers such as vinyl benzoate, benzyl vinyl formate, ethyl vinyl ether, methyl vinyl ether, vinylidene fluoride, lactic acid or lactic acid cyclic dimmer, glycolic acid or glycolide, hexamethylcyclotrisiloxane, 1H,1H,2H,2H-perfluorooctyl methacrylate, and vinyl acetate.

Although acrylamide and various acrylamide-containing compounds are described above, in some embodiments, such components are avoided. Thus, in one or more embodiments, the polymer matrix does not include, and is substantially free of, acrylamide and/or acrylamide-containing compounds.

The re-crosslinking agent ("Crosslinker II") is generally embedded within the polymer matrix of the swellable particles. As used herein, the "re-crosslinking agent" refers to any latent reagents that can react with the polymer matrix, thereby generating self-healing and discrete particle reassociations, to thus produce a bulk gel at subterranean conditions comprised of discrete polymer gel particles that associate to form an entirety possessing bulk gel properties. The re-crosslinking agent is generally embedded within the polymer matrix when HT-RPPG is synthesized. At higher temperature subterranean conditions, the re-crosslinking agent is able to react with the sidegroups of the polymer matrix, which forms covalent bonding. Thus, the re-crosslinking described herein (i.e., formation of covalent bonds) is distinct from other forms of re-association (i.e., ionic interactions), which may also occur due to other components within the HT-RPPG composition. In some embodiments, the re-crosslinking agent can react with the carboxylate group or amide group within the polymer matrix, wherein the crosslinking take place through transamidation. Generally, the one or more re-crosslinking agents comprise functional groups which can react with the functional groups on the polymer chains.

In some embodiments, the one or more re-crosslinking agents comprise one or more compounds having two or more amine groups. In some embodiments, the one or more re-crosslinking agents are selected from the group consisting of polyethylenimine, amino acids, tetraethylenepentamine, ceric ammonium nitrate, and combinations thereof. Additional re-crosslinking agents may include blocked isocyanates, which can form covalent bonds upon heating through a de-blocking temperature. Such crosslinkers can react with the amide groups on the polymer chains through transamidation or condensation reaction.

Environmentally friendly crosslinkers may also be used as the re-crosslinking agent and may be synthesized by replacing polyethylenimine with amino acid, as shown in FIG. 1. Amino acids such as arginine, histidine, or lysine may be used to synthesize the HT-RPPG.

As described in greater detail below, crosslinker chains are vulnerable to nucleophilic materials. To enhance the polymer chain stability under high temperature, in certain embodiments, a re-crosslinking agent may be synthesized which also acts as a crosslinking agent as defined below. Thus, in certain embodiments, the re-crosslinking agent can be self-synthesized crosslinker, which could act as both re-crosslinking agent ("Crosslinker II") and crosslinking agent ("Crosslinker I") described below. That is, in certain embodiments, the self-synthesized crosslinker can crosslink the monomers during polymerization (i.e., formation of the particle polymer matrix) and re-crosslink the polymer matrix of the particles after heating, as would be experienced in high temperature reservoir conditions. A synthetic scheme is shown in FIG. 1, vinyl benzyl chloride can be grafted onto the tetraethylenepentamine through nucleophilic substitution ($S_N1$).

In some embodiments, a secondary cross-linker and/or re-associating agent can also be embedded into the polymer matrix during polymerization but not activated during polymerization. Temperature control is a key factor in determining the process of reactivity of the secondary cross-linker or re-associating agent, resulting in a re-crosslinking or re-assembly process. The secondary crosslinking and/or re-associating agent can react with the polymer chains through coordination bonding, covalent bonding, and/or electrostatic interaction. In some embodiments, the secondary cross-linkers and/or re-associating agents include multivalent metal ions that are salts of, but not limited to, $Al^{3+}$, $Fe^{3+}$, $Cr^{3+}$, $Ti^{4+}$, $Sn^{4+}$, or $Zr^{4+}$. In some embodiments, the secondary cross-linkers and/or re-associating agents are selected from the group consisting of Cr (III) acetate, Zr (VI) acetate and Al (III) acetate, which are ionic associating crosslinkers.

In one or more embodiments, clays or nano-clays can be used to reinforce the HT-RPPG gel strength. In some embodiments, the clays or nano-clays may also act as a secondary cross-linker and/or re-associating agent. Exemplary clays and nano-clays may include sodium-montmorillonite, calcium montmorillonite, and smectite (e.g., Laponite-RDX, and Laponite-XLG). Particularly preferred clays and nano-clays include smectite clays that include surface groups that impart associating properties to the clays. In some embodiments, surfactants, and particularly cationic surfactants, can be used to help disperse the clays within the composition during particle formation.

Figure 2:
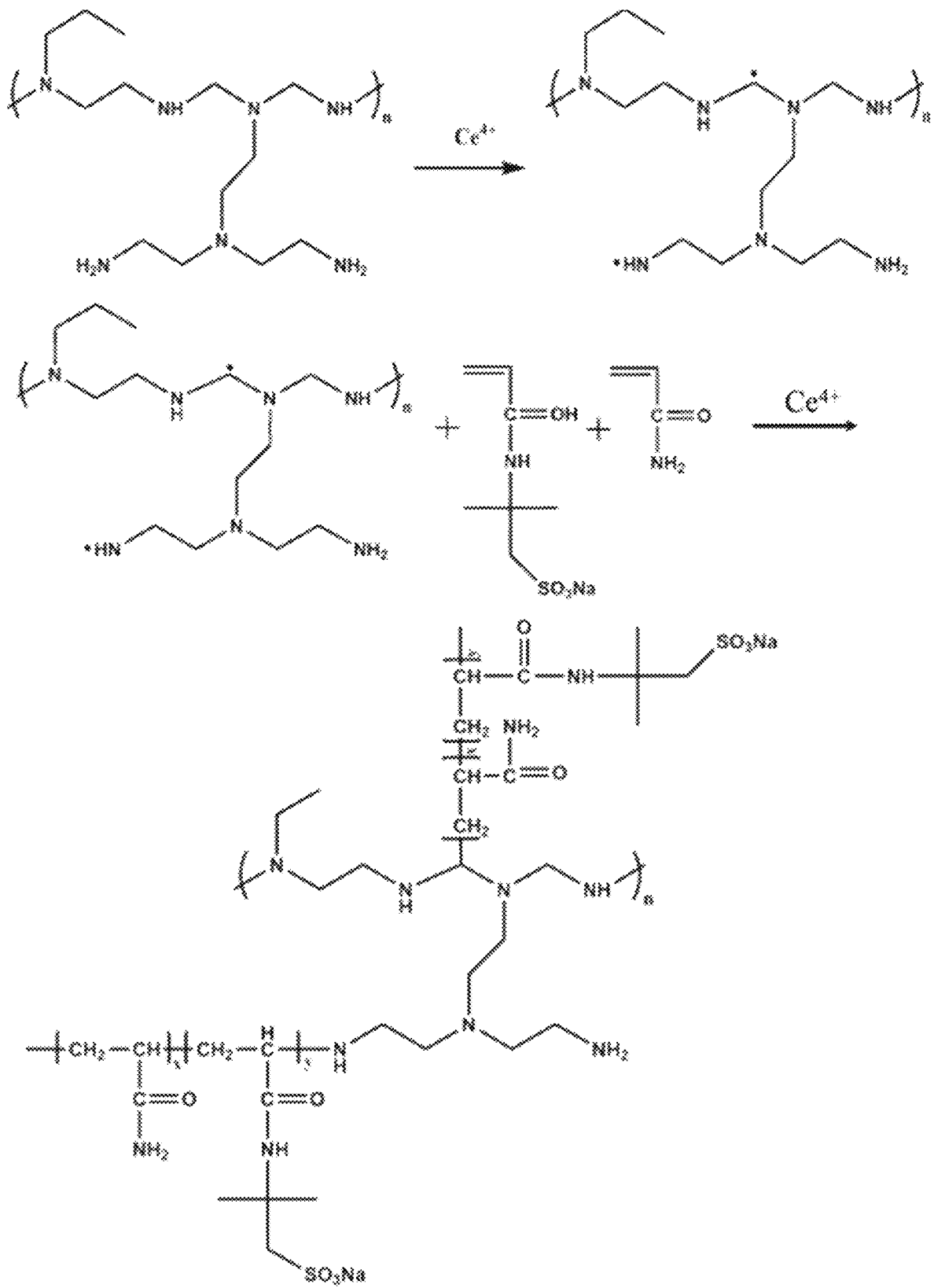
FIG. 2 depicts the redox reaction schemes between amino groups and $Ce^{4+}$.
Figure 3:
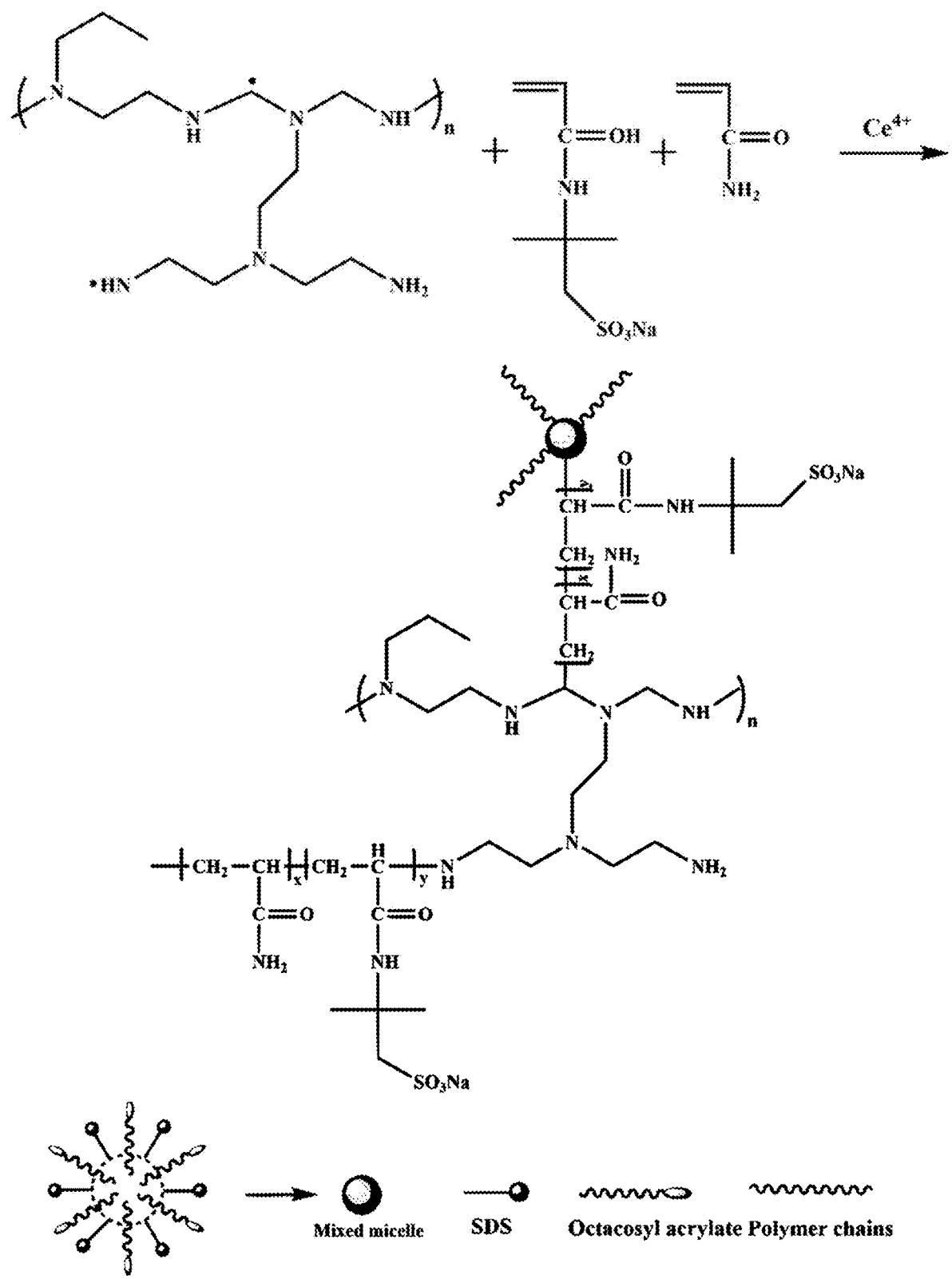
FIG. 3 depicts the reaction scheme of the synthesis of gels reinforced by hydrophobically associating groups.

In some embodiments, the HT-RPPG compositions further comprise one or more initiators. The one or more initiators may be used during polymerization of the polymer matrix of the particles. However, in some embodiments, the initiators are not present in the resulting particles or gel, due to decomposing, for example during the drying process. The initiators are generally compounds that can be used to generate free radicals. A variety of initiators may be used in accordance with embodiments of the present invention having the functionality described herein. In some embodiments, the one or more initiators are selected from the group consisting of ammonium persulfate, 2,2'-azobis(2-methylpropionamidine) dihydrochloride, the combination of FeSO$_4$ and H$_2$O$_2$, benzoyl peroxide, 2,2'-azoisobutyronitrile, ceric ammonium nitrate (reacting with amino groups—as shown in FIG. 2 and FIG. 3), and combinations thereof.

In some embodiments, the HT-RPPG compositions comprise one or more crosslinking agents ("Crosslinker I"). As used herein, "crosslinking agent" refers to any reagents that can connect the polymer chains via free radical crosslinking during polymer matrix synthesis, which takes place simultaneously with the formation of polymer chains. At this point, the crosslinking denotes a chemical crosslinking, namely permanent, covalent bonding. Thus, the crosslinking agents are used to crosslink forming covalent bonds between the one or more monomers and/or one or more polymers during formation of the polymer matrix (i.e., before grinding and formation of the swellable particles). The crosslinking agent may be any of a variety of compounds having bi-functional groups. In some embodiments, the crosslinking agent is a divinyl monomer that can copolymerize with vinyl monomers and form crosslinking points as the propagation of polymers. In some embodiments, the one or more crosslinking agents are selected from the group consisting of methylene bisacrylamide, diallylamide, divinyl sulfone, divinyl-benzene, poly (ethylene glycol) diacrylate, diethyleneglycol diallyl ether, and combinations thereof. In some preferred embodiments, the crosslinking agent comprises divinyl-benzene.

In other embodiments, the one or more crosslinking agents comprises diacrylyl tertiary amide, diacrylylpiperazine, diallyltartardiamide, dihydroxyethylene-bis-acrylamide, bis-acrylylcystamine, trimethylolpropane trimethacrylate, propyleneglycol triacrylate, tripropyleneglycol diacrylate, allyl methacrylate, triethyleneglycol dimethacrylate, tetrahydrofurfuryl methacrylate, trimethylolpropane triacrylate, and combinations thereof. In some embodiments, the crosslinking agent comprises a multifunctional crosslinker. Such multifunctional crosslinkers may include pentaerythritol triacrylate, 1,5 pentane diol dimethacrylate, pentaerythritol triallylether, and combinations thereof.

It should be understood that while such crosslinking agents described herein provide excellent mechanical strength, these crosslinking agents do not generally provide particle gels with re-associating or re-crosslinking properties. Rather, such properties are generally provided by the re-crosslinking agents.

In certain embodiments, the gel compositions comprise one or more additives. The additives herein are defined as any reagents that can facilitate the synthesis of HT-RPPG, can ameliorate the stability of re-crosslinked HT-RPPG, or can enhance the rheology property of HT-RRPG. In some preferred embodiments, the additives may be used, for example, to alter the gelation rate and reinforce the gel strength. The additive (or additives) may include one or more components from the following embodiments described herein.

Figure 4:
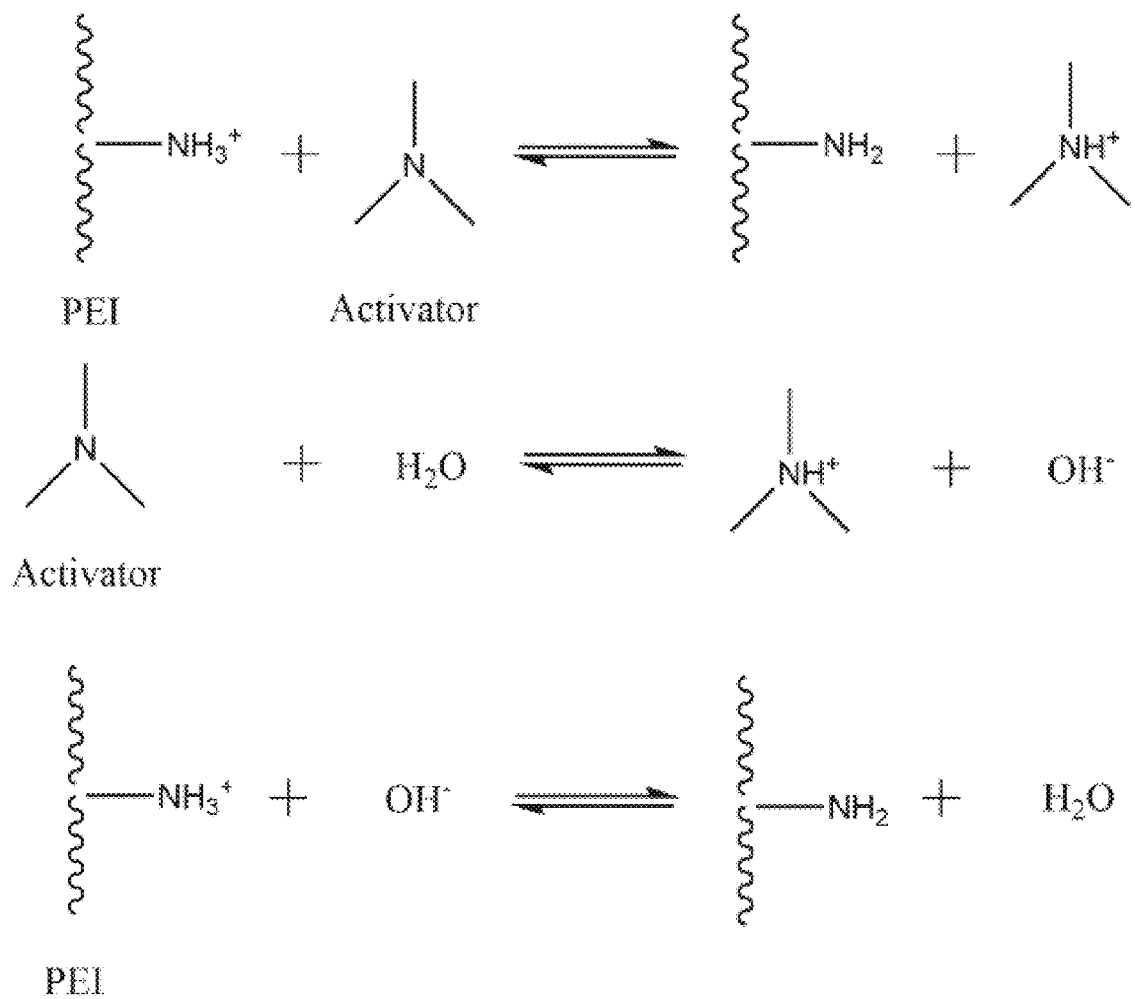
FIG. 4 is a schematic illustration of the interaction between PEI and retarders.

In some embodiments, the additive is an inorganic salt. Inorganic salts, which can be used to accelerate the reaction, include AlCl$_3$ and B(OH)$_3$. Polyamine, such as triethylenetetramine, tetraethylene pentamine, or pentaethylhexamine, can be used to accelerate the reaction. The mechanism is shown in FIG. 4. The reaction rate can be delayed by changing the solution pH or adding chemical retarders such as Na$_2$CO$_3$ and NH$_4$Cl.

In some embodiments, the additive is a chelating agent. The chelating agent may be included, for example, to alleviate the detriments of divalent cations (Ca2+ and Mg2+). In certain embodiments, the carrier fluid or formation water is rich of divalent cations, namely the brine with high hardness, such as the formation water of North Sea reservoirs. The divalent cations, in one aspect, induce the gel shrink through screening effect which will be more significant with the hydrolysis of the amide group and the formation of, ionic pedant, the carboxylate group. In another aspect, the gel may undergo severe syneresis due to the excessive crosslinking between divalent cations and polyelectrolytes in gel matrix. The addition of chelating agent described herein can bind with divalent cations forming a complex, and thereby diminish gel contraction and the tendency of syneresis or degradation. Exemplary chelating agents include salts of ethylenediaminetetraacetic acid (EDTA), the salts of citric acid, gluconic acid pentaphosphonate, hexaphosphonate, phosphino-poly(carboxylic acid) (PPCA) salts and amino carboxylate chelating agents such as N-(3-Hydroxypropyl)imino-N,N-diacetic acid, N-(2-Hydroxypropyl)imino-N,N-diacetic acid, N-glycerylimino-N,N-diacetic acid, dihydroxyisopropylimino-N,N-diacetic acid, methylimino-N,N-diacetic acid, 2-methoxyethylimino-N,N-diacetic acid, amidoiminodiacetic acid (sodium amidonitrilo triacetic acid), acetamidoiminodiacetic acid, 3-methoxypropylimino-N,N-diacetic acid, tris (hydroxymethyl) methylimino-N,N-diacetic acid. Other chelating agents include the salts of alginate, hydroxyethyliminodiacetic acid (HEIDA), hydroxyethylethylenediamine triacetic acid (HEDTA), glutamic acid diacetic acid (GLDA) and methylglycine N,N-diacetic acid (MGDA). In preferred embodiments, the chelating agent is the sodium salt of ethylenediaminetetraacetic acid (Na$_2$-EDTA).

In some embodiments, the additive is a rheological modifier or thickening agent. The rheological modifier herein refers to a water soluble, linear polymer which is introduced to increase the viscosity of gelling solution during HT-RPPG synthesis. By virtue of viscosifying, the re-crosslinking agent therefore can be embedded more homogeneously. Exemplary viscosifers (rheological modifier or thickening agent) include poly(vinyl alcohol), poly(acrylamide) or partially hydrolyzed poly(acrylamide) (HPAM), xanthan gum, and derivatives thereof. Moreover, the incorporation of rheology modifier induces a semi-interpenetrating of network through which the rheology property of re-crosslinking particles can be enhanced.

In some embodiments, the additive is a nanoparticle solid material (nanomaterial). The nanomaterial, which can be three-dimensional (spherical), one-dimensional (rod shaped), or two-dimensional (platelet) nanomaterial, is introduced to conduct the nanocomposite and, furthermore, improve the thermal stability and rheology properties of re-crosslinked gel. Exemplary three-dimensional nanomaterials include nanosilica, modified nanosilica, nano-sized metal oxide and modified nano-sized metal oxide. Exemplary one-dimensional nanomaterials include carbon nanotubes, nanocrystals, nanofibers, and functionalized or modified nanomaterials thereof. Exemplary two-dimensional nanomaterials include graphene, graphene oxide, and other nanometer-sized, layered particles comprised of silicates or aluminosilicate, such as nanoclays (such as those described above, or others), and functionalized or modified nanomaterials thereof.

In some embodiments, the additives can include a biocide. A biocide may be added to prevent the undesired biodegradation and to inhibit and control bacterial growth, which may proliferate enzymes that depolymerize polysaccharides, namely the re-crosslinking agent. Exemplary biocides include tetrakis(hydroxymethyl) phosphonium sulfate, sodium hypochlorite, didecyldimethylammonium chloride, tri-n-butyl tetradecyl phosphonium, chloride, and glutaraldehyde. Such biocides can be introduced to stabilize the re-crosslinking agent against bacterial attack.

In some embodiments, the additive comprises one or more oxygen scavengers. Oxygen scavengers are reducing agents which can consume the dissolved oxygen from aqueous solution through a gradual process of a redox reaction. In some embodiments, the one or more oxygen scavengers are selected from the group consisting of dithionite salts (i.e., sodium dithionite), thiosulfate salts (i.e., sodium thiosulfate), sulfite salts (i.e., sodium sulfite), bisulfite salts (i.e., sodium bisulfite), and metabisulfite salts persulfate salts (e.g., ammonium persulfate), or combinations thereof. In some preferred embodiments, the oxygen scavenger(s) comprise bisulfite salts, such as ammonium bisulfite and sodium bisulfite.

A variety of exemplary components used in the HT-RPPG compositions are described above. Some of the particularly preferred components for some embodiments are listed, along with their chemical structure, in Table 1.

TABLE 1

Chemicals used in this product

| Chemical | Structure |
| --- | --- |
| 4-Acryloylmorpholine | |
| Alginate sodium | |
| Acrylamide | |
| 2-Acrylamide-2-methyl-propanesulfonic acid | |
| Ammonium persulfate | $(NH_4)_2S_2O_8$ |
| Arginine | |
| Ceric ammonium nitrate | $(NH_4)_2Ce(NO_3)_6$ |
| Chromium acetate | |

TABLE 1-continued

Chemicals used in this product

| Chemical | Structure |
|---|---|
| Acryloyloxyethyltrimethyl ammonium chloride | 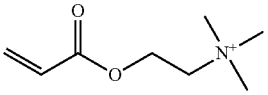 |
| Methacryloxyethyltrimethyl ammonium chloride | 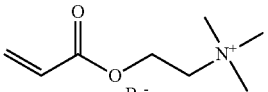 |
| (1-Hexadecayl)trimethyl-ammonium Bromide | 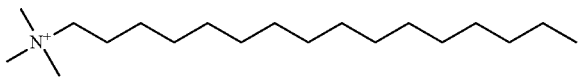 [SMILES: CCCCCCCCCCCCCCCC[N+](C)(C)C] |
| N,N'-Methylenebis(acrylamide) | 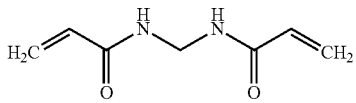 |
| Octacosyl acrylate | 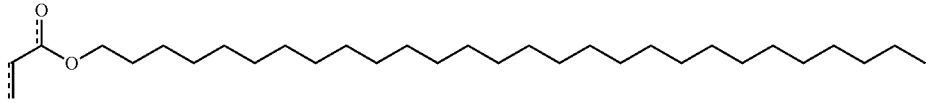 |
| Polyethylenimine | 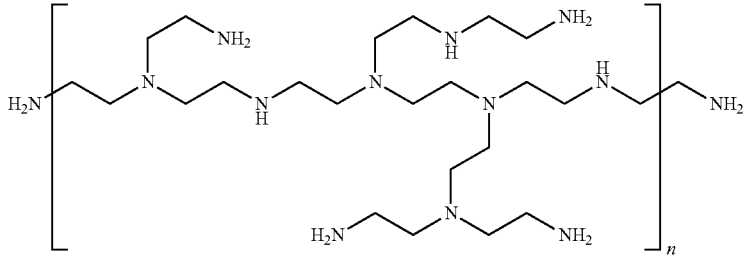 |
| Poly(vinyl alcohol) | 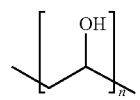 |
| Polyvinylpyrrolidone | 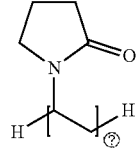 |
| Tetraethylene pentamine | 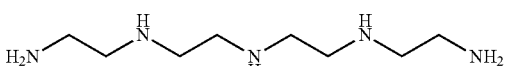 |
| 4-Vinyl benzyl chloride | 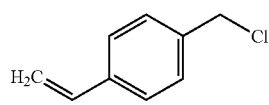 |

TABLE 1-continued

Chemicals used in this product

| Chemical | Structure |
|---|---|
| Zirconium acetate solution (16%) | 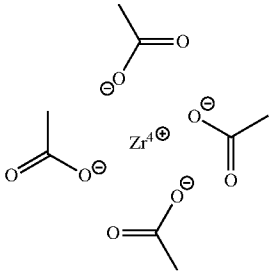 |

Regardless of the embodiment, in general, all of the aforementioned components are homogeneously distributed when the HT-RPPG is synthesized. In various embodiments, the HT-RPPG may comprise at least 50, 60, 70, 80, 90, 95, or 99 weight percent as polymer matrix, with the total weight of the polymer matrix, re-crosslinking agent, crosslinking agent, re-associating agent, initiators, clays, surfactants, and additives (if present) taken as 100 percent by weight. Furthermore, in various embodiments, the HT-RPPG may comprise at least 0.01, 0.02, 0.04, 0.06, 0.08, 0.1, 0.12, 0.14, or 0.16 and/or less than 20, 15, 10, 5, 4, 3, 2, or 1 weight-percent of the re-crosslinking agent, the crosslinking agent, re-associating agents, clays, surfactants, and/or the additives. The swelling rate, swelling ratio, and re-crosslinking rate can generally be adjusted by changing the composition via monomer, crosslinker, and/or initiator concentration ratios.

In various embodiments, the particles of the HT-RPPG composition may comprise an average particle size of at least 0.1, 0.2, 0.3, 0.4, or 0.5 mm and/or less than 10, 5, 4, 3, 2, 1, or 0.9 mm. In various embodiments, the particles of the HT-RPPG composition may comprise an average particle size of 0.1 to 100 m or as small as 10 nm, which can be obtained through grinding, ball milling or colloidal milling.

The HT-RPPG compositions in accordance with embodiments of the present invention may exhibit desirable rheological characteristics. In various embodiments, the HT-RPPG compositions may exhibit a storage modulus of at least 50, 100, 200, 300, 500, or 700 Pa and/or a loss modulus of at about 2 to about 100 Pa, preferably about 20 to about 60 Pa, as measured at a frequency of 1 Hz and a stress of 1 Pa at ambient temperature (23° C.). In some such embodiments, the above rheological characterisitics are exhibited, even after being exposed for at least 1 day, 10 days, 30 days, or 60 days, or 90 days, 6 months, 1 year, 2 years, 3 years, or 5 years at a temperature of greater than about 100° C., greater than about 110° C., greater than about 120° C., or up to about 130° C. Strength of the gel particles will be inversely proportional to the swelling volume of the particles when swollen with (formation) water or brine.

Furthermore, the HT-RPPG compositions may also exhibit desirable swelling properties. In various embodiments, the HT-RPPG may exhibit a swelling ratio of at least about 5, 10, 15, 20, 25, 30 and/or less than about 75, 60, 55, 50, or 45 after a time period of 2, 4, 6, 8, 10, 12, 15, 20, 25, 30, 35, or 40 hours at 23° C. or 73° F. in an aqueous solution comprising sea water (TDS ~40,000 ppm). The "swelling ratio" refers to the fractional increase in the weight of the particulate gel due to fluid absorption. The swelling ratio may be measured by the following formula:

$$SR = \frac{V_{particle,a}}{V_{particle,b}} = \frac{V_{total,a} - V_{water,a}}{V_{total,b} - V_{water,b}}$$

In accordance with the above formula, dry particles may be placed into a graduated cylinder and brine (e.g. 1 wt % NaCl) with a certain volume ($V_{water,b}$) may be added. The total volume of the brine and particles ($V_{total,b}$) may then be obtained. The total volume can be read again as $V_{total,a}$ once the particle volume does not increase and is considered fully swollen. The remaining brine may then be screened out and measured again for volume, $V_{water,a}$.

In various embodiments, the HT-RPPG compositions are in the form of particles having an initial average particle size prior to contacting the fluid and a second average particle size after contacting the fluid and swelling. In such embodiments, the second average particle size can be at least about 5, 10, 15, 20, 25, 30, 35, or 40 times greater than that of the initial average particle size.

Advantageously, the HT-RPPG compositions can maintain the swell ratio, with little or no reduction, over prolonged periods of time when exposed to high temperature and/or salinity conditions. In various embodiments, the "swollen" HT-RPPG exhibit less than about 50, 40, 30, 20, 15, 10, 5, 2, or 1 percent decrease in volume after being exposed for 1 hour, 2 hours, 5 hours, 12 hours, 1 day, 10 days, 30 days, or 60 days, 90 days, 6 months, 1 year, 2 years, 3 years, or 5 years at a temperature of greater than about 100° C., greater than about 110° C., greater than about 120° C., or up to 130° C.

The HT-RRPG described herein may be used to improve the conformance of water flooding, for controlling water production and increasing petroleum recovery, and as diverter for well stimulation. Therefore, in various embodiments, the HT-RPPG may be used in a method of forming a gel formation in a target zone of a subterranean environment. In certain embodiments, the subterranean environment is selected from the group consisting of wells and pipelines. In certain embodiments, the target zone is selected from the group consisting of fractures, conduits, lost-circulation zones, cavernous formations, high-permeability zones, wellbores, and perforations. The method generally comprises: (a) dispersing the HT-RPPG into a carrier fluid, thereby causing the swellable composition to swell; and (b) introducing the carrier fluid comprising the swellable composition into the target zone, thereby causing said re-crosslinking agent to react with said monomer and form said gel formation. The target zone generally has a temperature of at least 50° C., 85° C., 100° C., 110° C., 120° C., or 130° C., and/or less than 200° C., 190° C., 180° C., 170° C., or 160° C. In certain embodiments, the carrier fluid is selected from the group consisting of fresh water, produced water, sea water, brine, drilling fluid, and servicing fluid. In some embodiments, the carrier fluid has a salinity of about 1,000 to about 60,000 mg/L of TDS. In one or more embodiments, the HT-RPPG is dispersed into the carrier fluid at a weight ratio of about 1:1 to about 1:50, preferably 1:5 to about 1:20 dry HT-RPPG to carrier fluid.

In a particular embodiment, the present invention is directed to a plugging method. In oilfields, the preformed particles of the HT-RPPG can be pumped using fresh water, brine, or 'produced' water (i.e., water available on site for subterranean water flooding) as the carrier fluid. In subterranean conditions, the particles are transported along with the re-crosslinking agent that was embedded within the polymer matrix during gel synthesis, wherein all the constituents move as an entirety. Through proper placement of dry particle dispersions in a formation fluid into a target zone, the particles are accumulated in the fractures or conduits. Under the stimulus of reservoir temperature, the active re-crosslinking agent will cause all the particles to stick together, and thereby generate an elastic bulk gel based on the crosslinking reaction. This process, particularly the processing time, will be dependent on the reservoir temperature and the salinity or other characteristics of the carrier fluid, which can be artificially controlled locally by introducing reagents or additives into the placement fluid. After a re-crosslinking process time, a thermally stable gel with good mechanical integrity will block the target zone, and thereby divert the chased fluid, such as injected water, to the unswept zone; the re-crosslinked gel acts as a robust, high-temperature suitable plugging agent and maintains stability under harsh conditions. Consequently, the HT-RPPGs herein overcomes flaws of previous polymer gels, such as extrusion, dehydration, and mechanical vulnerability, and offers a superior alternative for conformance control.

In another particular embodiment, the present invention is directed to a method for well drilling and well treatments. In drilling process, the HT-RPPG can be added to drilling fluid as lost circulation materials (LCM). At subterranean conditions, the re-crosslinked gel will seal off the lost-circulation zones including cavernous formations, inherent or induced fractures, and high-permeability zones. The excessive flooding fluid requirement and production loss thereby can be prevented or mitigated, to enhance the efficiency of oil resource recovery. In like fashion, the HT-RPPG can be mixed with the servicing fluids of various well treatments such as completion, sand production control and workover to control the flooding fluid loss.

In another particular embodiment, the HT-RPPG can be added to fracturing fluids as a particulate diverter. The HT-RPPG can be pumped during the stimulation; the particles will re-crosslink and block the wellbores, perforations, or formation fractures; the resultant "barrier" will redirect the fluids to desired positions such as the perforation clusters. The fracturing efficiency herein will be ameliorated, and the stimulation process will be accelerated.

Embodiments of the present invention have a number of advantages over prior particle gel technologies. To improve the plugging efficiency of PPG in high temperature reservoirs with different channeling problems and avoid segregation or chromatographic problems of traditional multiple components in-situ gel system (such as those disclosed in U.S. Pat. No. 6,454,003 and U.S. Pat. App. Pub. No. 2014/0144628), embodiments of the present invention provide HT-RPPG compositions that have high mechanical strength, good inject-ability, and excellent long term high temperature resistance at temperatures greater than about 100° C., greater than about 110° C., about greater than 120° C., and up to about 130° C. In some embodiments, the HT-RPPG compositions described herein may exhibit excellent long-term high temperature resistance at temperatures greater than about 130° C.

To avoid chromatographic problems, polymerization is initiated from the surface of the latent crosslinker (re-crosslinking agent or secondary crosslinker) by using a redox initiation system (such as branched polyethylenimine (B-PEI) or amino acid or tetraethylenepentamine and ceric ammonium nitrate or the self-synthesized crosslinker described herein). Benefiting from this initiation system, a hyper-branched polymer gel is achieved. The compounds having amino groups act as a core and the post chain growth begins from the surface of those compounds. Thus, chromatographic problems can be avoided, and a gel with good homogeneity can be generated. The thermal degradation of traditional polymer gels is caused by the polymer chains being broken. However, the HT-RPPG compositions herein have excellent long-term thermal stability, benefiting from its branched structure.

To improve the PPG plugging efficiency in reservoirs with channeling problems, the HT-RPPG compositions described herein are endowed with a re-crosslinking property by using amine-containing chemical groups, for example via the branched polyethylenimine, amino acid, tetraethylenepentamine, and/or the self-synthesized crosslinker described herein. As mentioned above, the amine group-containing chemicals, not only act as the initiator during the polymerization process but also act as a crosslinker to crosslink the PPG in reservoir conditions. Taking PEI as an example, PEI can react with acrylamide-based polymers through transamidation reaction and form a stable covalent bond between PEI and polymer chains. Gels chemically crosslinked by PEI are much more stable than gels associatively crosslinked by metal ions under high temperature. The gelation time and gel strength can be adjusted by adding accelerator, retarder or changing the polymer's molecular weight, respectively. However, PEI and tetraethylenepentamine are toxic to aquatic lives and is banned for petroleum well injection by some countries. Considering the environmental regulations, for example, the offshore gel treatment project, PEI may be replaced with amino acid to obtain an environmentally friendly RPPG. Similar to PEI, some amino acids also have very high amino density, such as arginine and lysine, and these can re-crosslink the acrylamide-based gel very well.

In order to further enhance the gel strength, combinations of chemically and physically associative crosslinkers (cross-linking agents and/or re-crosslinking agents) can be used in combination thus forming a Double Network ("DN") structure. In the DN structure, hydrophobic association and organic-inorganic interaction can be applied to enhance the gel strength. DN gels may employ two kinds of network: the first network is a highly cross-linked, mechanically stiff polyelectrolyte chain; the second network is a cross-linked network or uncross-linked linear flexible polymer chains. DN gels can exhibit notable improvement especially in mechanical strength, compared to single-network structures. Poly (vinyl alcohol) (PVA), sodium alginate (Alg) and poly (vinyl pyrrolidone) (PVP) are particular polymers in the DN gels. For organic-inorganic interaction, nanoparticles such as clay can be employed as the inorganic component to enhance gels strength since an ionic clay surface can act as a physically associating crosslinker. However, clays naturally exist as tactoids and the interaction between tactoid shaped clay and polymer chains can be very weak. In addition, it is difficult to disperse discrete clay particles from layered aggregates by simple stirring. Thus, in order to enhance the interaction between polymer chains and clay, cationic surfactants may be used to separate layers of clay apart, which can also be called intercalation or exfoliation. After intercalation or exfoliation, cationic monomers can be physically grafted on the clay surface and benefiting from this association, the entanglement of polymer chains is enhanced, and a mechanically robust gel can be achieved. For hydrophobic interactions, with an addition of electrolyte, a micellar structure can phase transform from spheroidal to rod- or worm-like micelles. Thus, in the presence of NaCl and sodium dodecyl sulfate (SDS), a self-healing gel may be synthesized through micellar copolymerization of hydrophobic monomer (e.g., stearyl (C18) methacrylate or docosyl (C22) acrylate) with hydrophilic monomer (e.g., acrylamide). The gel product is thus endowed with self-healing properties, due to a reversible dissociation and association of the hydrophobic cross-links.

Figure 5:
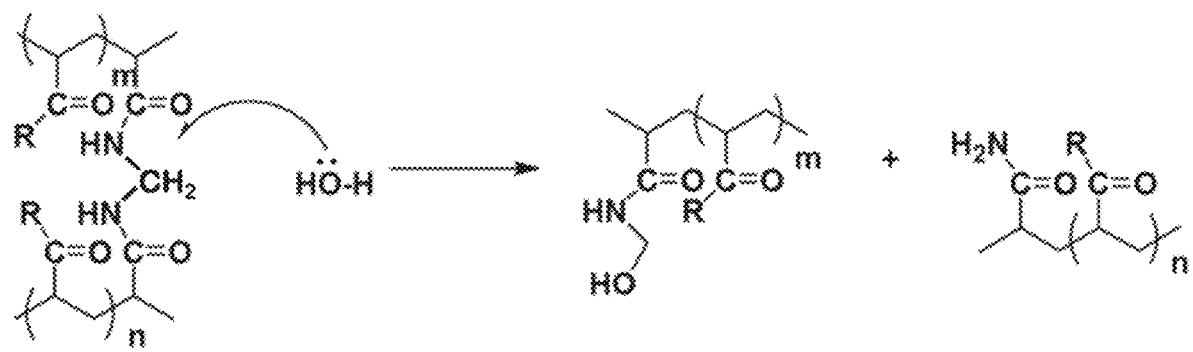
FIG. 5 depicts the degradation mechanism of N, N'-methylene-bis-(acrylamide).

Enhanced stability may be achieved by use of a synthesized crosslinker, as described herein. Some primary crosslinkers in the PPG production process are poly (ethylene glycol) diacrylate and N, N'-methylene-bis-(acrylamide), but these can be the weak point in the polymer chain. Poly (ethylene glycol) diacrylate begins to degrade when the temperature is higher than 45° C. For poly (N, N'-methylene-bis-acrylamide), it has similar Td (degradation temperature) to acrylamide. To enhance the stability of crosslinking bond, the crosslinker as described herein can synthesized and has better thermal stability and can act as both primary and secondary crosslinker in different conditions. As shown in FIG. 5, under high temperature reservoir conditions, the rupture of cross-linker chains is due to the attack on the methylene carbon from the nucleophilic aqueous solution. Thus, the polymer chains will break and degrade into oligomers, which from a macro perspective, the gel will lose strength and degradation will be observed. To overcome the drawbacks mentioned above, the crosslinker described herein can be synthesized by using tetraethylenepentamine and vinyl benzyl chloride. After the reaction, the "C=C" can be grafted on the tetraethylenepentamine, enabling radical polymerization active and this chemical will act as primary and secondary crosslinker in different conditions.

Moreover, by adding some metallic re-associating agents or crosslinkers, the HT-RPPG compositions can re-associate physically at a wide range of temperature (45-80° C.). For example, zirconium acetate, aluminum chloride, and/or chromium acetate may be applied to endow the HT-RPPG with physical re-association ability at low temperature.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth embodiments in accordance with the invention. It should be understood, however, that these examples are provided by way of illustration, and noting therein should be taken as a limitation upon the overall scope of the invention.

The following abbreviations are used herein and apply to all Examples below unless otherwise specified.

TABLE 2

Abbreviation of chemicals

| Abbreviation | Chemical |
|---|---|
| ACMO | 4-Acryloylmorpholine |
| Alg | Alginate sodium |
| AM | Acrylamide |
| AMPS | 2-Acrylamide-2-methylpropanesulfonic acid |
| APS | Ammonium persulfate |
| Arg | Arginine |
| CAN | Ceric ammonium nitrate |
| DAC | Acryloyloxyethyltrimethyl ammonium chloride |
| DMC | Methacryloxyethyltrimethyl ammonium chloride |
| HETA | (1-Hexadecyl) trimethyl-ammonium Bromide |
| $HNO_3$ | Nitric acid |
| LAP | Laponite-RDX |

TABLE 2-continued

Abbreviation of chemicals

| Abbreviation | Chemical |
|---|---|
| MBA | N,N'-Methylenebis(acrylamide) |
| Na-MMT | Sodium-montmorillonite |
| NaOH | Sodium hydroxide |
| OA | Octacosyl acrylate |
| PEI | Polyethylenimine |
| PVA | Poly(vinyl alcohol) |
| PVP | Polyvinylpyrrolidone |
| TP | Tetraethylene pentamine |
| VBC | 4-Vinyl benzyl chloride |
| Zr | Zirconium acetate solution |

Example 1

AM/MBA Initiated by PEI and CAN

A representative hyper-branched polymer gel was prepared using free radical polymerization. In this process, AM (15.00 g, 211.27 mmol) and PEI (0.50 g, Mw 25,000) were added into the deionized water (35.00 g). Under vigorous stirring, MBA (0.50 mg, 0.003 mmol) was dropped into the solution. $HNO_3$ was used to adjust the solution pH (3~5). After bubbling with argon for 30 min under room temperature (23° C.), CAN (0.02 g, 0.03648 mmol) was added to initiate the polymerization. 30 min later, the flask was placed in an oil-bath at 60° C. for 4 hours, after which the bulk gel was dried and grinded.

Example 2

AM/AMPS/MBA Initiated by PEI and CAN

A representative hyper-branched polymer was prepared using free radical polymerization. In this process, AM (6.70 g, 94.30 mmol), AMPS (8.30 g, 40.10 mmol), NaOH (1.63 g, 40.10 mmol), and PEI (0.50 g, Mw 25,000) were added into the deionized water (35.00 g). Under vigorous stirring, MBA (0.50 mg, 0.003 mmol) was dropped into the solution. $HNO_3$ was used to adjust the solution pH (3~5). After bubbling with argon for 30 min under room temperature (23° C.), CAN (0.02 g, 0.03648 mmol) was added to initiate the polymerization. 30 min later, the flask was placed in an oil-bath at 60° C. for 4 hours, after which the bulk gel was dried and grinded.

Example 3

Double Network (DN) Structure-AM/PVA/MBA Initiated by PEI and CAN

A representative hyper-branched polymer gel with DN structure was prepared using free radical polymerization. In this process, AM (12.50 g, 175.93 mmol), PVA (2.50 g, 10 wt % solution, 25 g (aqueous phase), Mw 89,600), and PEI (0.50 g, Mw 25,000) were added into the deionized water (12.50 g). Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.050 g, 0.0912 mmol) was added to initiate the polymerization. 30 min later, the flask was placed in an oil-bath at 60° C. for 4 hours, after which the bulk gel was dried and grinded.

Example 4

DN Structure-AM/ACMO/PVA/MBA Initiated by PEI and CAN

A representative hyper-branched polymer gel with DN structure was prepared using free radical polymerization. In this process, AM (1075 g, 151.30 mmol), ACMO (2.25 g, 15.94 mmol), PVA (2.50 g, 10 wt % solution, 25 g (aqueous phase), Mw 89,600), and PEI (0.50 g, Mw 25,000) were added into the deionized water (12.50 g). Under vigorous stirring, MBA (0:50 mg, 0.0030 mmol) was dropped into the solution. $HNO_3$ was used to adjust the solution pH (3~5). After bubbling with argon for 30 min under room temperature (23° C.), CAN (0.050 g, 0.0912 mmol) was added to initiate the polymerization. 30 min later, the flask was placed in an oil-bath at 60° C. for 4 hours, after which the bulk gel was dried and grinded.

Example 5

Clay-Reinforced RPPG-AM/LAP/MBA Initiated by PEI and $Ce^{4+}$

A representative clay-reinforced hyper-branched polymer gel was prepared using free radical polymerization. In this process, LAP (1.00 g) was dispersed in deionized water (35.00 g). After magnetic stirring for 1 h, AM (15.00 g, 211.26 mmol) and PEI (0.50 g, Mw 25,000) were added into the solution. Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

Example 6

Clay Reinforced RPPG-AM/DAC/Na-MMT/MBA Initiated by PEI and $Ce^{4+}$

A representative clay reinforced hyper-branched polymer gel was prepared using free radical polymerization. In this process, Na-MMT (1.30 g), HETA (0.028 g, 0.079 mmol), and DAC (3.50 g, 18.13 mmol) were dispersed in deionized water (35.00 g). After magnetic stirring for 24 h and ultrasonication for 2 h, AM (11.50 g, 185 161.29 mmol) and PEI (0.50 g, Mw 25,000) were added into the solution. Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

Example 7

Clay Reinforced RPPG-AM/DMC/Na-MMT/MBA Initiated by PEI and $Ce^{4+}$

A representative clay reinforced hyper-branched polymer gel was prepared using free radical polymerization. In this process, Na-MMT (1.30 g), HETA (0.028 g, 0.079 mmol), and DMC (1.00 g, 4.83 mmol) were dispersed in deionized water (35.00 g). After magnetic stirring for 24 h and ultrasonication for 2 h, AM (14.00 g, 197.18 mmol) and PEI (0.50 g, Mw 25,000) were added into the solution. Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

Example 8

Hydrophobic Interaction-AM/OA/MBA Initiated by PEI and $Ce^{4+}$

A representative hyper-branched polymer gel was prepared using free radical polymerization. In this process OA (1.00 g, 2.15 mmol), SDS (3.50 g, 12.15 mmol), and NaCl (2.34 g, 40.00 mmol) was dispersed in deionized water (35.00 g). After magnetic stirring for 2 h, AM (14.00 g, 197.18 mmol) and PEI (0.50 g, Mw 25,000) were added into the solution. Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

Example 9

Environmentally Friendly RPPG

The typical synthesis process of environmentally friendly RPPG is listed below. AM (15.00 g, 211.26 mmol) and Arg (0.15 g) were added into the deionized water (35.00 g). Under vigorous stirring, MBA (0.50 mg, 0.0030 mmol) was dropped into the solution. $HNO_3$ was used to adjust the solution pH (3~5). After bubbling with argon for 30 min under room temperature (23° C.), CAN (0.10 g, 0.1824 mmol) was added to initiate the polymerization. 30 min later, the flask was placed in an oil-bath at 60° C. for 4 hours, after which the bulk gel was dried and grinded.

Example 10

New Crosslinker

Figure 6:
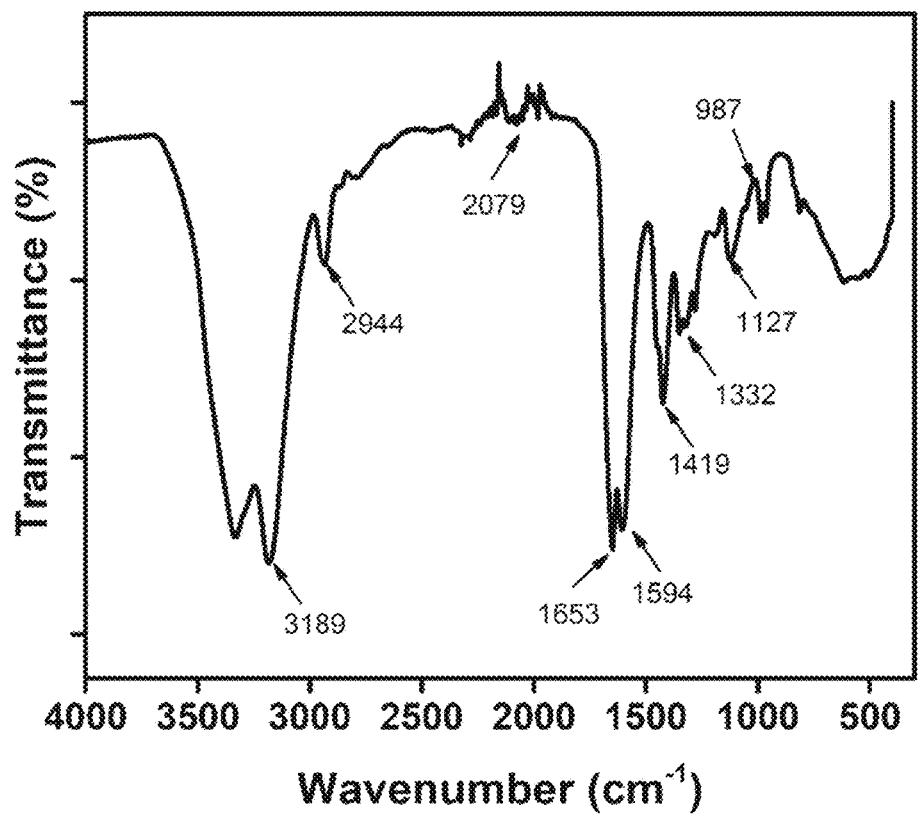
FIG. 6 shows FTIR spectra of a gel crosslinked by a self-synthesized crosslinker from a mixture of tetraethylenepentamine, sodium bicarbonate, alcohol, and vinyl benzyl chloride.

A new crosslinker synthesis process is as follow. First, tetraethylenepentamine (2.5 g, 13.21 mmol) and sodium bicarbonate (2.21 g, 26.21 mmol) were dispersed in alcohol. Afterward, vinyl benzyl chloride (4 g, 26.21 mmol) was added into the solution drop-by-drop with stirring speed 300/rpm. After reacting for 5 hours, the crude product was filtered and dried in vacuo at 40° C. for 24 h. The FT-IR of a gel crosslinked by this crosslinker is shown in FIG. 6.

A representative hyper-branched polymer gel crosslinked by the self-synthesized crosslinker above was prepared using free radical polymerization. AM (15.00 g, 211.26 mmol) and the self-synthesized crosslinker (0.15 g) were added into the deionized water (35.00 g). $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

Example 11

Nano-Sized RPPG

A representative hyper-branched nano polymer gel crosslinked by the self-synthesized crosslinker (described in Example 10) was prepared using emulsion polymerization. In this process, a solution of AM (15.00 g, 211.26 mmol) and the self-synthesized crosslinker (0.15 g) in water with a total weight of 30 g was added to the mixture of Span 80 (10 g), Tween 60 (6 g), and decane (70 g). The mixture was degassed with nitrogen for 15 min at 40° C. before APS (20 mg, 0.088 mmol) was added to initiate the polymerization. The mixture was stirred at 45° C. for 4 h with argon purging before precipitated in acetone (250 mL). The nanogel was further purified by acetone washing and dried in vacuo at 60° C. to give as a white solid.

Example 12

RPPG with Re-Association Ability at Low to Medium Temperature

A representative hyper-branched polymer gel which has self re-association ability was prepared using free radical polymerization. AM (15.00 g, 211.26 mmol) and PEI (0.50 g, Mw 25,000) and Zr (1 g) were added into the deionized water (35.00 g). $HNO_3$ was used to adjust the solution pH (3~5). After bubbling with argon for 30 min under room temperature (23° C.), CAN (0.20 g, 0.3648 mmol) was added to initiate the polymerization. 30 min later, the flask was placed in an oil-bath at 60° C. for 4 hours, after which the bulk gel was dried and grinded.

The invention claimed is:
1. A composition for controlling fluid flow, said composition comprising a plurality of swellable particles, said particles comprising a re-crosslinking agent embedded within a polymer matrix, and wherein upon swelling, said particles exhibit less than about 50 percent decrease in volume after being exposed to a temperature of at least about 100° C. for at least about 1 hour,
wherein said re-crosslinking agent is selected from the group consisting of tetraethylenepentamine, ceric ammonium nitrate, and

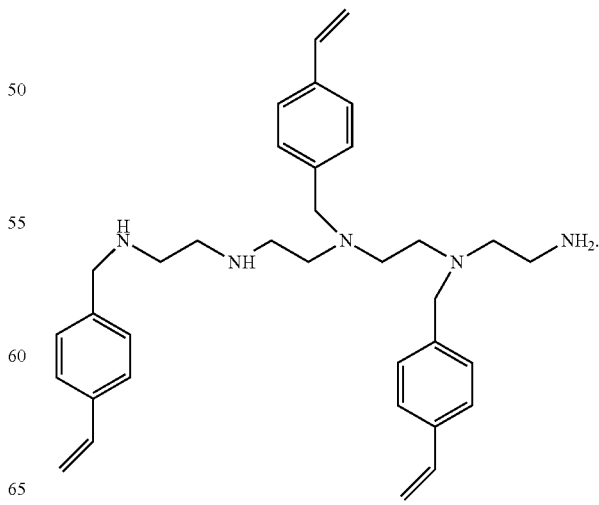

2. The composition of claim 1, wherein said particles further comprise a re-associating agent comprising a clay or a salt of a multivalent metal ion.

3. The composition of claim 1, wherein said particles further comprise a crosslinking agent selected from the group consisting of methylene bisacrylamide, diallylamide, divinyl sulfone, divinyl-benzene, poly (ethylene glycol) diacrylate, diacrylyl tertiary amide, diacrylylpiperazine, diallyltartardiamide, dihydroxyethylene-bis-acrylamide, bis-acrylylcystamine, trimethylolpropane trimethacrylate, propyleneglycol triacrylate, tripropyleneglycol diacrylate, allyl methacrylate, triethyleneglycol dimethacrylate, tetrahydrofurfuryl methacrylate, trimethylolpropane triacrylate, pentaerythritol triacrylate, 1,5 pentane diol dimethacrylate, pentaerythritol triallylether, and combinations thereof.

4. The composition of claim 1, wherein the crosslinking agent comprises divinyl-benzene.

5. The composition of claim 1, wherein said polymer matrix comprises:
   one of more monomers selected from the group consisting of acrylamide, 2-acrylamide-2-aethylpropanesulfonic acid, 4-acryloylmorpholine, N,N-dimthylacrylamide, N-methylolacrylamide, acryloyloxyethyltrimethyl ammonium chloride, methacryloxyethyltrimethyl ammonium chloride sodium, 4-ethenylbenzene-1-sulfonate, acrylic acid, vinyl acetate, N-vinyl formamide, N-viny pyrrolidone, 4-vinylpyridine, tolylene-2, 4-diisocyanate, octacosyl acrylate, vinylimidazole, dodecyl acrylate, hexadecyl acrylate, and octacosyl acrylate;
   one or more monomers selected from the group consisting of acrylamide, methacrylamide, N-methylacrylamide, N-tert-butylacrylamide, N-ethylacrylamide, N-hydroxyethyl acrylamide, N-isopropylacrylamide, N,N-diethylacrylamide, dimethylaminopropyl acrylamide, dimethylaminopropyl methacrylamide, acrylamide, N-isopropylacrylamide, N,N-dimethylacrylamide, N,N-diethylacrylamide, dimethylaminopropyl acrylamide, dimethylaminopropyl methacrylamide, and N-vinyl formamide;
   one or more monomers selected from the group consisting of sulfonates, sulfates, and phosphates;
   2-acrylamido-2-methyl-1-propanesulfonic acid sodium salt;
   one or more monomers selected from the group consisting of diallyldimethylammonium chloride, (3-(methacryloylamino) propyl) trimethyl ammonium chloride, (2-(methacryloyloxy) ethyl) trimethyl ammonium chloride, and vinylbenzyl trimethyl ammonium chloride, dimethylaminoethylacrylate methyl chloride quaternary salt, dimethylaminoethylacrylate benzyl chloride quaternary salt, and dimethylaminoethylmethacrylate methyl chloride quaternary salt;
   one or more monomers selected from the group consisting of hydroxyethyl acrylate, hydroxypropyl acrylate, hydroxyethyl methacrylate, hydroxypropyl methacrylate, dimethylaminoethylacrylate (DMAEA), dimethylaminoethyl methacrylate (DMAEM), alkyl esters, α-olefins, vinyl alkylates, vinyl alkyl ethers, N-vinyl amides, and alkyl aromatics; and/or
   one or more polymers selected from the group consisting of poly (vinyl alcohol), sodium alginate, and poly (vinyl pyrrolidone).

6. The composition of claim 1, wherein said polymer matrix comprises one or monomers comprising a re-crosslinkable moiety.

7. The composition of claim 6, wherein said one or more monomers comprise one or more amide groups and/or isocyanate groups.

8. The compositions of claim 1, wherein the particles have an average particle size of 10 nm to 10 mm.

9. A method of forming the composition of claim 1, said method comprising:
   (a) polymerizing said polymer matrix in the presence of said re-crosslinking agent to form said polymer matrix and embed said re-crosslinking agent within said polymer matrix;
   (b) drying said polymer matrix to form a dried polymer matrix; and
   (c) grinding said dried polymer matrix to form said composition.

10. The method of claim 9, wherein said polymerizing of step (a) occurs at a temperature of at least 20° C. and/or less than 200° C.

11. The method of claim 9, wherein said polymerizing of step (a) comprises ultrasonication.

12. The method of claim 11, wherein said ultrasonication occurs for at least 10 minutes and/or less than 6 hours.

13. The method of claim 9, wherein said polymerizing of step (a) occurs for at least 1 hour and/or less than 18 hours.

14. A method of forming a gel formation in a target zone of a subterranean environment, said method comprising:
   (a) dispersing the composition of claim 1 into a carrier fluid, thereby causing said swellable particles to swell; and
   (b) introducing said carrier fluid comprising said composition into said target zone having a temperature of at least 50° C., thereby causing said re-crosslinking agent to react with a monomer within said polymer matrix and form said gel formation.

15. The method of claim 14, wherein said carrier fluid is selected from the group consisting of fresh water, produced water, sea water, brine, and drilling fluid.

16. The method of claim 14, wherein said subterranean environment is selected from the group consisting of wells and pipelines.

17. The method of claim 14, wherein said target zone is selected from the group consisting of fractures, conduits, lost-circulation zones, cavernous formations, high-permeability zones, wellbores, and perforations.

18. The method of claim 14, wherein said particles have an initial average particle size prior to said contact and wherein upon contact with said fluid, said particles swell to a second average particle size that is at least about 5 times greater than that of the initial average particle size.

19. A synthetic crosslinking and/or re-crosslinking compound having the chemical formula:

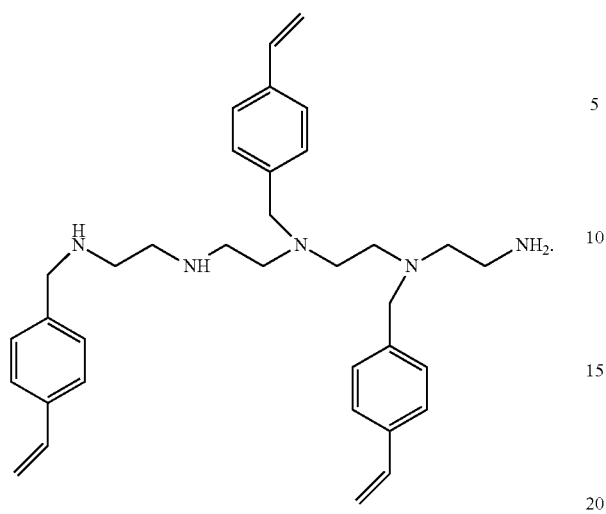
20. The composition of claim 1, wherein the polymer matrix is free of $CO_2$-philic moieties.
* * * * *